United States Patent
Bösch et al.

(10) Patent No.: US 11,402,203 B2
(45) Date of Patent: Aug. 2, 2022

(54) SENSOR MODULE FOR APPLICATIONS WITH HANDHELD RANGEFINDER INSTRUMENT

(71) Applicant: LEICA GEOSYSTEMS AG, Heerbrugg (CH)

(72) Inventors: Thomas Bösch, Lustenau (AT); Markus Hammerer, Fraxern (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 891 days.

(21) Appl. No.: 16/151,567

(22) Filed: Oct. 4, 2018

(65) Prior Publication Data

US 2019/0107392 A1   Apr. 11, 2019

(30) Foreign Application Priority Data

Oct. 5, 2017   (EP) ..................... 17195025

(51) Int. Cl.
*G01C 3/08* (2006.01)
*G01S 17/08* (2006.01)
(Continued)

(52) U.S. Cl.
CPC .............. *G01C 3/08* (2013.01); *G01S 7/4808* (2013.01); *G01S 7/51* (2013.01); *G01S 17/08* (2013.01);
(Continued)

(58) Field of Classification Search
CPC .......... G01S 17/08; G01S 7/4808; G01S 7/51; G01S 17/86; G01S 17/48; G01S 17/42;
(Continued)

(56) References Cited

U.S. PATENT DOCUMENTS 5,815,251 A   9/1998   Ehbets et al.
6,903,810 B2   6/2005   Gogolla et al.
(Continued)

FOREIGN PATENT DOCUMENTS

DE   102 14 742 A1   10/2003
DE   10 2008 042440 A1   4/2010
(Continued)

OTHER PUBLICATIONS

EP1718989B1—google-translation (Year: 2006).*
(Continued)

*Primary Examiner* — Yuqing Xiao
*Assistant Examiner* — Amir J Askarian
(74) *Attorney, Agent, or Firm* — Maschoff Brennan (57) ABSTRACT

A sensor module for connection to a handheld rangefinder instrument and for providing sensor data for the rangefinder instrument includes an electronic interface for connection to an applicable interface of the rangefinder instrument, and at least one electronic sensor component for generating the sensor data. A system for handheld measurement of distances to a surface region of an object includes a sensor module of this kind and a handheld rangefinder instrument having a first laser rangefinder. When the interfaces are connected to one another, the sensor module is configured for transmitting the sensor data to the rangefinder instrument, and the interfaces are configured for transmitting electric power from the rangefinder instrument to the sensor module, in which the sensor module is configured to operate the at least one sensor component by means of the electric power transmitted by the rangefinder instrument.

14 Claims, 6 Drawing Sheets

(51) Int. Cl.
*G01S 17/86* (2020.01)
*G01S 7/48* (2006.01)
*G01S 7/51* (2006.01)
*G01B 21/22* (2006.01)
*G01C 15/00* (2006.01)

(52) U.S. Cl.
CPC .............. *G01S 17/86* (2020.01); *G01B 21/22* (2013.01); *G01C 15/002* (2013.01)

(58) Field of Classification Search
CPC ........ G01S 7/4813; G01S 17/10; G01S 17/89; G01S 7/4817; G01S 17/66; G01S 7/4811; G01S 7/4812; G01S 7/4818; G01S 7/4972; G01S 17/32; G01S 17/87; G01S 7/4802; G01S 7/481; G01S 7/486; G01S 17/34; G01S 17/36; G01S 17/58; G01S 7/003; G01S 7/4815; G01S 7/4816; G01S 7/4863; G01S 7/4865; G01C 3/08; G01C 15/002; G01C 15/006; G01C 15/06; G01C 1/02; G01C 11/02; G01B 21/22
See application file for complete search history.

(56) References Cited

U.S. PATENT DOCUMENTS

| | | | |
|---|---|---|---|
| 8,094,291 B2 | 1/2012 | Zimmerman | |
| 2003/0218736 A1* | 11/2003 | Gogol | G01C 3/22 356/3.1 |
| 2005/0111301 A1* | 5/2005 | Rickman | G01S 17/86 367/99 |
| 2007/0206174 A1* | 9/2007 | Boegel | G01S 7/4813 356/4.01 |
| 2009/0138233 A1* | 5/2009 | Kludas | G01S 17/89 702/158 |
| 2009/0296072 A1* | 12/2009 | Kang | G01C 3/10 356/18 |
| 2011/0021293 A1* | 1/2011 | York | A63B 71/06 473/407 |
| 2011/0288818 A1* | 11/2011 | Thierman | G01B 11/28 702/159 |
| 2013/0260824 A1* | 10/2013 | Chen | G01S 17/08 455/556.1 |
| 2013/0271744 A1* | 10/2013 | Miller | G01C 3/08 356/4.01 |
| 2014/0090264 A1* | 4/2014 | Li | G01C 3/08 33/760 |
| 2014/0190025 A1* | 7/2014 | Giger | G01C 15/002 33/290 |
| 2014/0240689 A1* | 8/2014 | Arbouzov | G01S 17/08 356/4.01 |
| 2014/0378184 A1 | 12/2014 | Thorat | |
| 2015/0029488 A1* | 1/2015 | Zhou | G01C 3/08 356/4.01 |
| 2016/0313121 A1* | 10/2016 | Hill | G01C 15/004 |
| 2016/0341546 A1* | 11/2016 | An | G01B 11/14 |
| 2019/0041516 A1* | 2/2019 | Edwards | G01S 17/86 |

FOREIGN PATENT DOCUMENTS

| | | | | |
|---|---|---|---|---|
| DE | 10 2009 040468 A1 | 3/2011 | | |
| EP | 0 738 899 A1 | 10/1996 | | |
| EP | 0 701 702 B1 | 2/1997 | | |
| EP | 1718989 A1 * | 11/2006 | | G01C 3/08 |
| EP | 1 718 989 B1 | 6/2007 | | |
| EP | 2698600 A1 * | 2/2014 | | G01C 3/08 |
| FR | 2876445 A1 | 4/2006 | | |
| GB | 2409070 A * | 6/2005 | | G01C 15/002 |
| GB | 2483721 A * | 3/2012 | | G01C 1/04 |
| WO | 02/50564 A2 | 6/2002 | | |
| WO | 2014/027002 A1 | 2/2014 | | |

OTHER PUBLICATIONS

EP2698600A1—google-translation (Year: 2014).*
USB Specification (1996) (Year: 1996).*
European Search Report dated Mar. 16, 2018 as received in Application No. 17195025.6.

* cited by examiner

SENSOR MODULE FOR APPLICATIONS WITH HANDHELD RANGEFINDER INSTRUMENT

FIELD

The present disclosure relates to a sensor unit ("sensor module") modularly connectable to a handheld rangefinder instrument, and to a modularly designed system comprising a handheld rangefinder instrument and a sensor unit of this kind.

BACKGROUND

In many applications, methods and systems are used for measuring distance. Examples of these are extremely precise surveys in geodetic applications, but also measurement tasks in the field of building installation or for industrial process controllers.

For these tasks, static, mobile or else handheld rangefinder instruments are used that perform an optical distance measurement at a selected measurement point. For the most part, this involves a laser beam being emitted and being received again and evaluated following reflection from the target. To determine the distance, various measurement principles are available for this, such as e.g. phase or propagation time measurement.

In particular in the field of building installation or building inspection, portable handheld instruments are used that are positioned relative to a structure to be surveyed and then perform a distance measurement to a surface. A handheld rangefinder instrument that is suitable for applications of this kind is described in EP 0 738 899 and EP 0 701 702, for example.

Since a measurement point that is visible on the surface to be measured is advantageous for most applications, for the most part red lasers are used as radiation sources for the distance measurement. Rangefinders in some other applications can thus be used to attain accuracies in the millimeter range with a great deal of user friendliness.

Handheld rangefinder instruments available hitherto have a particular sensor configuration and therefore have a stipulated scope of functions, a larger scope of functions normally also rendering the instrument larger and heavier. As a result, the instrument becomes unwieldy as the scope of functions increases, and use becomes strenuous and complicated for the user. To cover more of the desired functions, an alternative possibility for the user is to purchase multiple more compact rangefinder instruments with a different scope of functions. This is unnecessarily expensive, however, and carrying all of these rangefinder instruments around is moreover awkward.

SUMMARY

It is therefore an example aspect of the present disclosure to provide an improved system for the handheld measurement of distances.

In particular, it is an example aspect to provide a system of this kind that renders the scope of functions of a handheld rangefinder instrument flexibly extendable.

It is a further example aspect of the present disclosure to provide an interchangeable sensor module for extending the scope of functions of a handheld rangefinder instrument.

In particular, it is an example aspect to provide a sensor module of this kind that is in a particularly light and compact configuration.

It is a further example aspect of the present disclosure to provide a sensor module of this kind having low design complexity.

At least one of these example aspects may be achieved by the realization of the present disclosure as claimed in independent and/or dependent claims.

A first aspect of the present disclosure relates to a sensor module for connection to a handheld rangefinder instrument and for providing sensor data for the rangefinder instrument. The sensor module has an electronic interface for connection to an applicable interface of the rangefinder instrument, and at least one electronic sensor component for generating the sensor data, wherein the sensor module is configured for transmitting the sensor data to the rangefinder instrument when the electronic interface is connected to the applicable interface for the rangefinder instrument. The electronic interface is configured for transmitting electric power from the rangefinder instrument to the sensor module when it is connected to the applicable interface of the rangefinder instrument, and the sensor module is configured to operate the at least one sensor component by means of the electric power transmitted by the rangefinder instrument.

According to some embodiments, the sensor module has no power supply of its own in this case.

In one embodiment, the sensor module is configured as an angle measuring module for measuring at least one angle between the rangefinder instrument and a base, wherein the at least one electronic sensor component comprises at least one angle sensor.

In a further embodiment, the sensor module is configured as an angle measuring module for measuring at least two angles between the rangefinder instrument and a base, wherein the at least one electronic sensor component comprises at least two angle sensors.

In a further embodiment of the sensor module according to the present disclosure, the at least one electronic sensor component comprises a laser rangefinder.

In a further embodiment of the sensor module according to the present disclosure, the sensor module has an extendable tape measure, and the electronic sensor component is configured to sense an extended length of the tape measure.

In a specific embodiment, the electronic sensor component comprises an absolute value transmitter in this case.

In a further embodiment of the sensor module according to the present disclosure, the electronic sensor component comprises a color sensor and/or a thermographic camera.

In a further embodiment of the sensor module according to the present disclosure, the electronic sensor component comprises a moisture sensor and/or temperature sensor.

A second aspect of the present disclosure relates to a system for the handheld measurement of distances to a surface region of an object. The system has a handheld rangefinder instrument having a first laser rangefinder and has a sensor module having at least one electronic sensor component for generating sensor data, in particular a sensor module according to the first aspect of the present disclosure.

The rangefinder instrument has a first electronic interface, and the sensor module has a second electronic interface, wherein the first and second interfaces are configured to be connected to one another and to provide a data connection between the rangefinder instrument and the sensor module. The sensor module is configured to provide the rangefinder instrument with the sensor data via the data connection, and the rangefinder instrument has a computation component for processing the sensor data. According to the present disclosure, the first and second interfaces are configured to transmit electric power from the rangefinder instrument to the sensor module, and the sensor module is configured to operate the at least one sensor component using the transmitted power.

According to one embodiment of the system according to the present disclosure, the rangefinder instrument has a storage battery for providing the electric power.

According to a further embodiment of the system according to the present disclosure, the first laser rangefinder is configured for emitting a first laser beam in a first emission direction to a first target.

In one embodiment of the system, the at least one electronic sensor component comprises a second laser rangefinder, which is configured for emitting a second laser beam in a second emission direction to a second target, in particular wherein the first and second emission directions are parallel or orthogonal.

According to a further embodiment of the system according to the present disclosure, the computation unit is configured to compute a distance to a target also based on the sensor data.

According to a further embodiment of the system according to the present disclosure, the rangefinder instrument has a display unit for outputting measured distances, in particular configured as a touchscreen, wherein the display unit is also configured for outputting the sensor data.

According to a further embodiment of the system according to the present disclosure, the sensor module is configured as an angle measuring module for measuring at least one angle between the rangefinder instrument and a base, wherein the at least one electronic sensor component comprising at least one angle sensor, and the computation unit is configured to take measured distances to a first and a second target and to take sensor data generated by the at least one angle sensor between the measurements as a basis for computing a distance between the first and second targets.

BRIEF DESCRIPTION OF THE DRAWINGS

The sensor module according to the present disclosure and the system according to the present disclosure comprising the handheld rangefinder instrument and the sensor module are described in more detail below purely by way of example on the basis of specific exemplary embodiments depicted schematically in the drawings, with further advantages of the present disclosure also being discussed. Specifically.

DESCRIPTION OF EXAMPLE EMBODIMENTS

Figure 1:
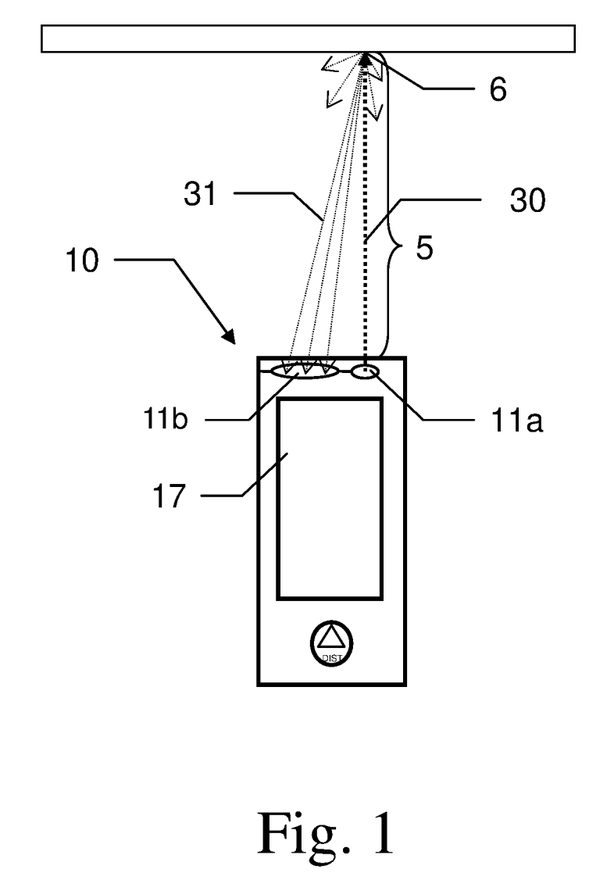
FIG. 1a-b show a generic handheld rangefinder instrument with a laser rangefinder.

FIG. 1 depicts an exterior view of a generic handheld rangefinder instrument 10 for surveying distances. It has a housing in which the electronic components are arranged. The housing in this case is configured such that the rangefinder instrument 10 can be held in the hand and also positioned or fastened at or to a point to be surveyed. For this purpose, the housing may have applicable bearing edges or fold-out or plug-on stop elements fitted to it, as are described in WO 02/50564, for example. The front of the range finger instrument 10 includes a laser rangefinder 11 having a laser transmission unit 11a and a laser reception unit 11b that have optical openings in the housing. On the top of the instrument, there are an input and display apparatus 17 in the form of a touchscreen. Further, a target-seeking camera—not depicted here—with a zoom functionality may be provided for the purpose of recording images in the direction of the emission direction that are displayable on the display apparatus 17.

According to the present disclosure, the laser transmission unit 11a transmits a laser beam 30 to a measurement point 6 on an object (for example a wall). The object has a naturally rough surface from which optical rays are reflected in a scattering manner. Some of the rays 31 of the laser beam 30 that are reflected in a scattered manner are collected by the laser reception unit 11b, detected and converted into an electrical signal. The signal is evaluated by an electronic circuit in a manner known per se to determine the digital value of the distance 5. The distance can be ascertained using e.g. phase or propagation time measurement. This also takes into consideration the extent between the laser reception unit 11b and a measurement stop. The value, digitally determined by the evaluation, of the measured distance 5 is then made available to a user by the display apparatus 17.

Figure 2A:
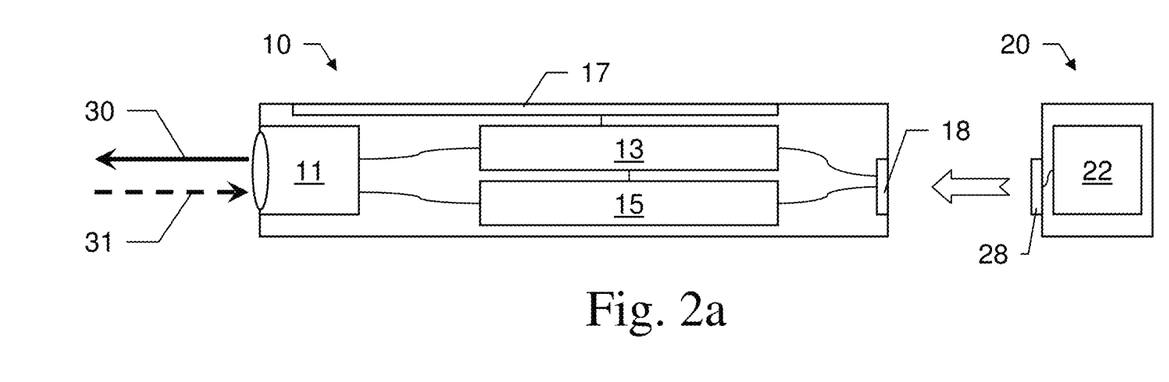
FIG. 2a-b show a system according to the present disclosure comprising the handheld rangefinder instrument and the sensor module in a longitudinal sectional view.

FIG. 2a shows a longitudinal sectional view of a system comprising a rangefinder instrument 10 and a sensor module 20 connectable thereto. The rangefinder instrument 10 has a laser rangefinder 11 for measuring distances to remote objects. Said laser rangefinder is configured to transmit a laser beam 30 and to receive rays 31 of the laser beam that are reflected in a scattered manner. The rangefinder instrument moreover has a touchscreen 17 as an input and display apparatus. The internal components depicted are a computation component 13 having an electronic circuit for processing sensor data provided by the laser rangefinder 11 and a storage battery 15 for providing electric power for the components of the rangefinder instrument 10.

The rangefinder instrument 10 has a first electronic interface 18 for connecting the rangefinder instrument 10 to an external sensor module 20 to form a system according to the present disclosure. The sensor module 20 has an electronic sensor component 22 and a second electronic interface 28 compatible with the first electronic interface 18. The two interfaces 18, 28 are in this case configured specifically for connection to one another and to transmit both data and electric current.

Figure 2B:
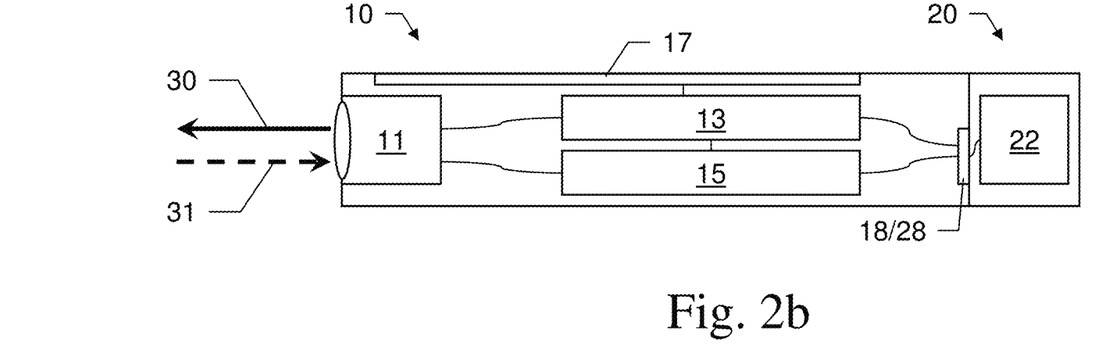

FIG. 2b depicts the rangefinder instrument 10 and the sensor module 20 from FIG. 2a in the interlocked state. The interfaces 18 and 28 have been plugged together such that there is a data connection between the rangefinder instrument 10 and the sensor module 20, so that sensor data of the sensor component 22 are transmittable to the computation unit 13. At the same time, the interlocked interfaces allow power to be supplied to the sensor module 20 via the storage battery of the rangefinder instrument 10, so that the electronic sensor component 22 of the sensor module 20 can capture the sensor data. This allows the sensor module 20 to be in a passive configuration, e.g. to not need to have a power supply of its own. As a result, it may advantageously be in a particularly compact and light configuration.

Optionally, the rangefinder instrument 10 and the sensor module 20 have not only the electronic interfaces 18, 28 but also further connecting elements for mechanical fixing to one another.

In some embodiments, the housings of the rangefinder instrument 10 and the sensor module 20 are of a nature, and coordinated to one another, such that their surfaces terminate flush in the interlocked state.

Conceivable sensor components 22 are, in principle, all electronic sensors that need electricity to work and that generate sensor data. In particular, they may be sensors of this kind that add to functions of the rangefinder instrument directly or indirectly, or provide a user with additional measurement-relevant information, for example inclination sensors, additional laser rangefinders (see FIG. 4) or target-seeking cameras. Additionally, it is also advantageously possible to use sensors of this kind that are useful to a user using the rangefinder instrument 10 within the realms of his activity. Within the realms of building installation or building inspection, this may be a moisture and/or temperature sensor, for example. Similarly, the sensor component 22 may be configured as a color sensor or thermographic camera. The modular design, allowing a fast change between different sensor modules 20, means that the user can advantageously be provided with a broad scope of functionality.

Figure 3:
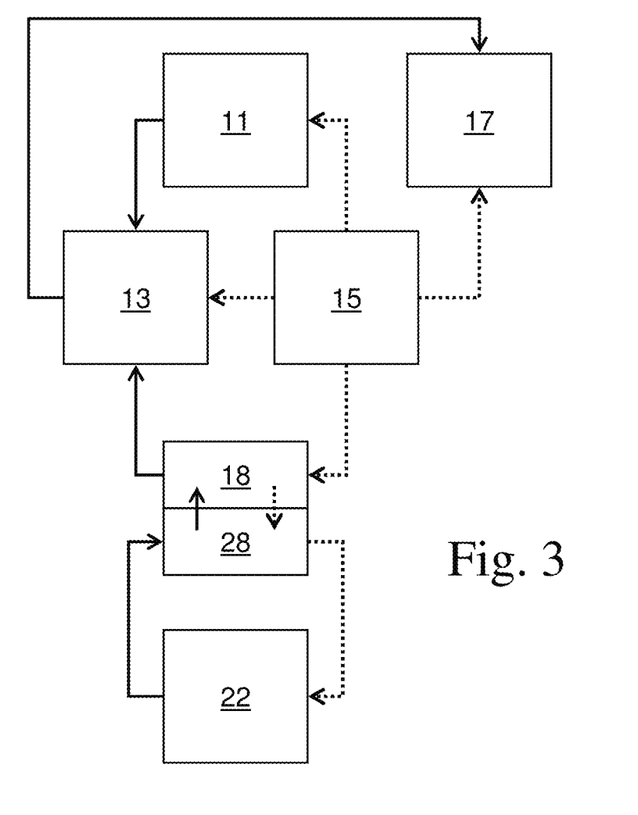
FIG. 3 shows the flow of power and information in a system according to the present disclosure.

FIG. 3 schematically illustrates the flow of data and power in the system from FIG. 2b. Flows of data are depicted by solid lines in this case, and flows of current by dotted lines.

The power supply unit 15 (e.g. a storage battery) of the rangefinder instrument firstly supplies power to the other components of the rangefinder instrument, that is to say the laser rangefinder 11, the computation unit 13 and the display unit 17. Secondly, it provides electric power for the first interface 18. In the interlocked state of the interfaces 18, 28, the sensor component 22 of the sensor module is thus likewise supplied with power by the power supply unit 15.

The laser rangefinder 11 provides the computation unit 13 with data on the basis of which a distance to a target is ascertainable. This distance can then be provided to the display unit 17, to display it to a user. The sensor component 22 of the connected sensor module uses the two interfaces to likewise provide data for the computation unit 13, which are able to be used for computing the distance, for example, or are displayable to the user on the display unit 17.

Figure 4:
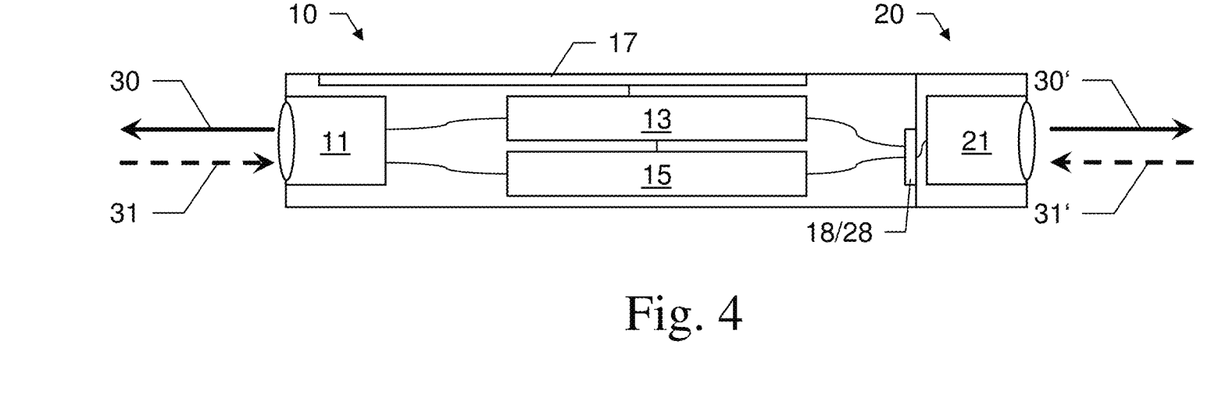
FIG. 4 shows a first exemplary embodiment of a system according to the present disclosure.

FIG. 4 shows a first exemplary embodiment of a system according to the present disclosure. The rangefinder instrument 10 is consistent with that depicted in FIG. 2b. The sensor module 20 has a second laser rangefinder 21 as a sensor component. Said second laser rangefinder is configured to transmit a second laser beam 30' and to receive rays 31' of the second laser beam that are reflected in a scattered manner. In the interlocked state of the system, the second laser rangefinder 21 is supplied with power by the power supply unit 15 of the rangefinder instrument 10 via the interfaces 18, 28. Likewise using the interfaces 18, 28, the second laser rangefinder 21 sends data captured by it to the computation unit 13 of the rangefinder instrument 10. It is then possible for a total distance between two measurement points targeted by the laser beams 30, 30' to be ascertained and displayed, for example.

Figure 5:
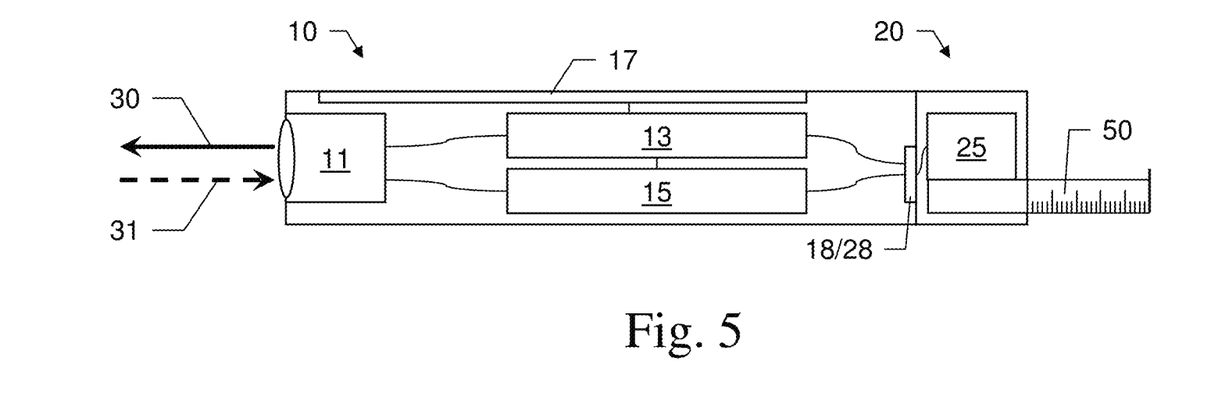
FIG. 5 shows a second exemplary embodiment of a system according to the present disclosure.

FIG. 5 shows a second exemplary embodiment of a system according to the present disclosure. In this case, the sensor module has an extendable tape measure 50. The sensor component supplied with power by the power supply unit 15 of the rangefinder instrument 10 is in this case configured as an absolute value transmitter 25 by means of which an extended length of the tape measure 50 is ascertainable. This value can be transmitted to the computation unit 13. As depicted in EP 1 718 989 EP, for example, it is then possible for a distance between a measurement point targeted by the laser beam 30 and a stop point defined by the end of the tape measure 50 to be ascertained and displayed to the user on the display unit 17.

Figure 6A:
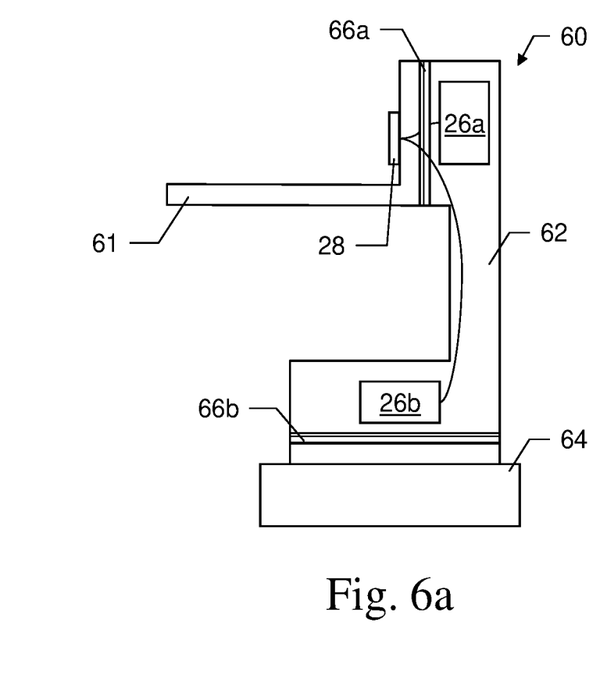
FIG. 6a-c show a third exemplary embodiment of a system according to the present disclosure.
Figure 6B:
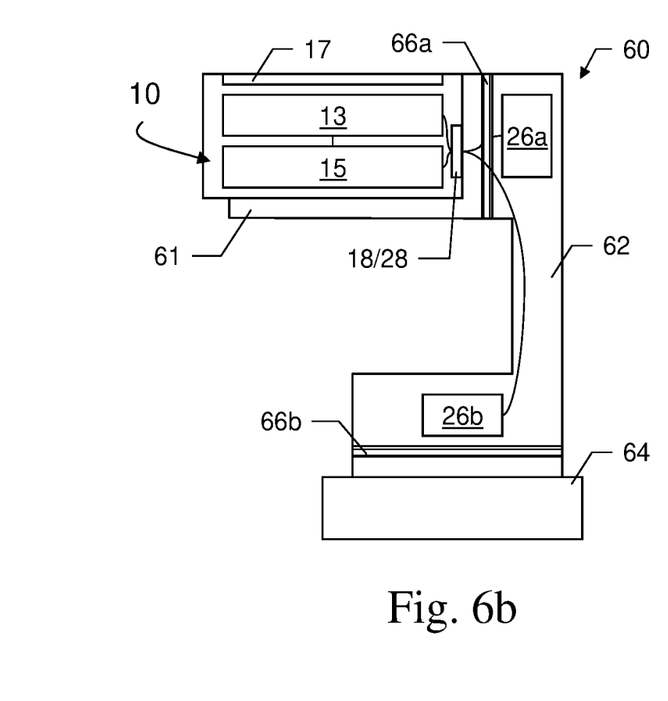
Figure 6C:
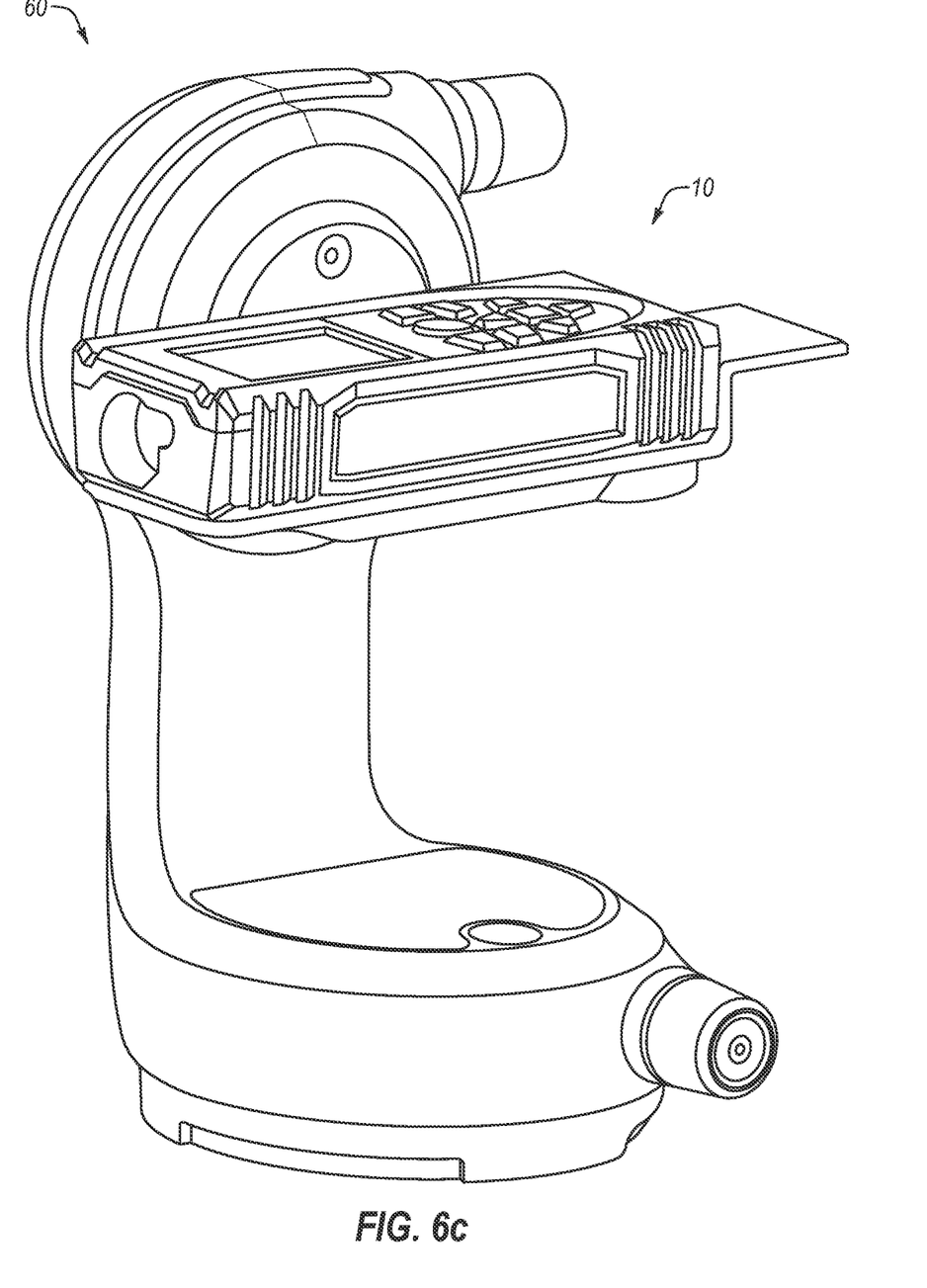

FIG. 6a-c show a third exemplary embodiment of a system according to the present disclosure by means of which measurements between two remote points, inter alia, can be performed. It is also possible for many currently available handheld rangefinder instruments to be used to perform measurements from one point to another point at which there is a line of sight. A possibility for determining a distance between two points that is also able to be used when there is no line of sight between the points is computation by means of trigonometry. This is already sufficiently well known from ground-based surveying instruments, such as theodolites or total stations. A generic handheld rangefinder instrument having this capability is described in WO 2014/027002 A1, but does not have the modular design according to the present disclosure.

FIG. 6a shows the sensor module configured as an angle measuring module 60. Said sensor module has a receiving area 61 that is configured together with the interface 28 for mounting a rangefinder instrument 10 without play. FIG. 6b depicts the angle measuring module 60 with the rangefinder instrument 10 mounted thereon. FIG. 6c shows a three-dimensional view of an exemplary configuration of the rangefinder instrument 10 mounted on an angle measuring module 60.

The angle measuring module 60 is configured so as to be mountable on a base 64, e.g. a tripod, and provides a level of adjustability for the orientation of the rangefinder instrument 10 in 2° of freedom relative to the base 64. The receiving area 61 is supported rotatably relative to a support 62 by means of a first hinge 66a, and the support 62 is supported rotatably relative to the base 64 by means of a second hinge 66b. Two angle sensors 26a and 26b on the hinges 66a, 66b are configured to determine a respective angle of rotation and to provide the applicable data to the computation unit 13 of the connected rangefinder instrument 10. The angle measurement module 60 is in a passive configuration, e.g. has no power supply of its own, but rather draws the power for the angle sensors 26a and 26b via the interfaces 18, 28 by virtue of the power supply unit 15 of the rangefinder instrument 10.

Optionally, there may be electric motors provided to alter the orientation of the rangefinder instrument 10 in a motorized manner. These can likewise be supplied with the electric power by the power supply unit 15 of the rangefinder instrument 10.

The depicted figures depict some possible exemplary embodiments schematically. The various approaches can likewise be combined with one another as with methods and instruments from other applications.

The invention claimed is:

1. An angle measuring module for connection to a handheld rangefinder instrument and for providing sensor data for the rangefinder instrument, the module being configured to be mountable on a base and providing adjustability for the orientation of the rangefinder instrument in two degrees of freedom relative to the base and for measuring at least one angle between the rangefinder instrument and a base, having a second electronic interface for connection to a first electronic interface of the rangefinder instrument, and at least one electronic sensor component for generating the sensor data, wherein the at least one electronic sensor component comprises at least one angle sensor, wherein the angle measuring module is configured for transmitting the sensor data to the rangefinder instrument when the second electronic interface is connected to the first electronic interface for the rangefinder instrument, wherein:
the second electronic interface is configured for transmitting electric power from the rangefinder instrument to the angle measuring module when it is connected to the first electronic interface of the rangefinder instrument, and
the angle measuring module is configured to operate the at least one sensor component by means of the electric power transmitted by the rangefinder instrument.

2. The angle measuring module according to claim 1, wherein the angle measuring module has no power supply of its own.

3. The angle measuring module according to claim 1, wherein the angle measuring module is configured for measuring at least two angles between the rangefinder instrument and a base; and
the at least one electronic sensor component comprises at least two angle sensors.

4. The angle measuring module according to claim 1, wherein the at least one electronic sensor component comprises a laser rangefinder.

5. The angle measuring module according to claim 1, wherein:
the angle measuring module has an extendable tape measure, and
the at least one electronic sensor component is configured to sense an extended length of the tape measure,
the at least one electronic sensor component comprises an absolute value transmitter.

6. The angle measuring module according to claim 1, wherein the at least one electronic sensor component comprises a color sensor and/or a thermographic camera.

7. The angle measuring module according to claim 1, wherein the at least one electronic sensor component comprises a moisture sensor and/or temperature sensor.

8. A system for handheld measurement of distances to a surface region of an object, the system having:
the handheld rangefinder instrument and the angle measuring module according to claim 1 wherein the handheld rangefinder instrument comprising a first laser rangefinder and a computation unit for processing the sensor data and the angle measuring module configured to be mountable on a base and providing adjustability for the orientation of the rangefinder instrument in two degrees of freedom relative to the base and having at least one electronic sensor component measuring at least one angle between the rangefinder instrument and the base, wherein:
the rangefinder instrument has a first electronic interface,
the angle measuring module has a second electronic interface,
the first and second interfaces are configured to be connected to one another and to provide a data connection between the rangefinder instrument and the angle measuring module,
the angle measuring module is configured to provide the rangefinder instrument with the sensor data via the data connection, and
the first and second interfaces are configured to transmit electric power from the rangefinder instrument to the sensor module, and
the angle measuring module is configured to operate the at least one sensor component using the transmitted power.

9. The system according to claim 8, wherein the rangefinder instrument has a storage battery for providing the electric power.

10. The system according to claim 8, wherein the first laser rangefinder is configured for emitting a first laser beam in a first emission direction to a first target.

11. The system according to claim 10, wherein the at least one electronic sensor component comprises a second laser rangefinder, which is configured for emitting a second laser beam in a second emission direction to a second target, the first and second emission directions are parallel or orthogonal.

12. The system according to claim 10, wherein the computation unit is configured to compute a distance to a target also based on the sensor data.

13. The system according to claim 8, wherein the rangefinder instrument has a display unit for outputting measured distances, the display unit configured as a touchscreen and further configured for outputting the sensor data.

14. The system according to claim 8, wherein:
the angle measuring module is configured for measuring at least one angle between the rangefinder instrument and a base, wherein the at least one electronic sensor component comprises at least one angle sensor, and
the computation unit is configured to take measured distances to a first and a second target and to take sensor data generated by the at least one angle sensor between the measurements as a basis for computing a distance between the first and second targets.

* * * * *